UNITED STATES PATENT OFFICE.

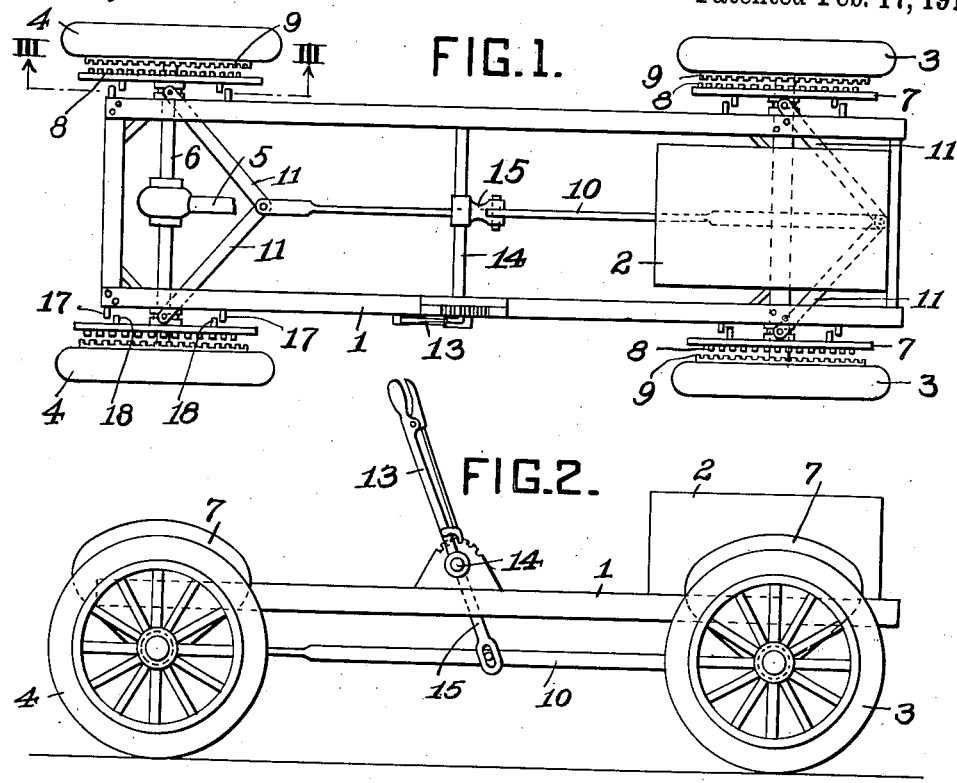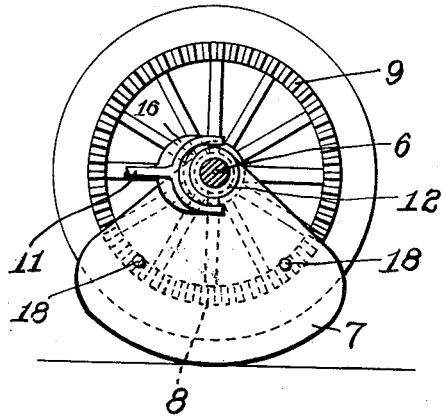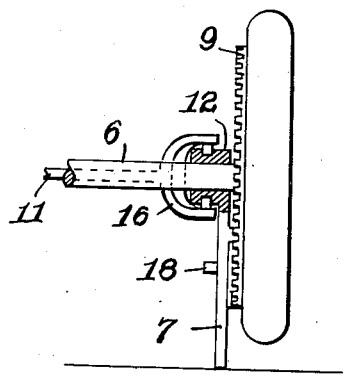

EDWARD W. McCARROLL, OF PITTSBURGH, PENNSYLVANIA.

VEHICLE-JACK.

1,087,250.  Specification of Letters Patent.  Patented Feb. 17, 1914.

Application filed July 7, 1913. Serial No. 777,654.

*To all whom it may concern:*

Be it known that I, EDWARD W. MCCARROLL, residing at Pittsburgh, in the county of Allegheny and State of Pennsylvania, a citizen of the United States, have invented or discovered certain new and useful Improvements in Vehicle-Jacks, of which improvements the following is a specification.

The object of my invention is to provide motor propelled vehicles, such as automobiles, motor trucks, etc., with means for applying the propelling power of the vehicle to raise the wheels from the ground, or, in other words, to raise the vehicle from its normal support through its wheels.

In the accompanying drawing, which forms part of my specification, I have illustrated a single embodiment of my invention, such embodiment comprising means for raising all the wheels simultaneously from the ground.

Figure 1 is a plan view of an automobile chassis with lifting mechanism operatively arranged thereon; Fig. 2 is an elevation of the disclosure of Fig. 1; Fig. 3 is a detail sectional view to enlarged scale, the plane of section being indicated by the line III—III, Fig. 1; and Fig. 4 is a side view of the disclosure of Fig. 3, the movable sleeve being shown in section.

In Figs. 1 and 2 the lifting mechanism is shown in its normal upward or inoperative position, while in Figs. 3 and 4 a lifting jack is shown in its operative wheel-raising position.

In the several figures like numerals are used to designate like parts.

In the embodiment of my invention illustrated in the drawings a frame 1, upon which is mounted a motor 2, is normally sustained through front wheels 3 and rear driven wheels 4, the motor being operatively connected through drive shaft 5 to the rear driven axle 6, as is usual in automobile construction.

The means which I have illustrated herein for raising the wheels 3 and 4 from the ground by means of the motor or propelling power of the vehicle, comprise a plurality of jacks 7, consisting of wheel segments of larger radius than that of the periphery of the wheel, one of such jacks being mounted adjacent to each wheel. The jacks, which are rotatably mounted preferably upon the wheel axles and are longitudinally slidable thereon, are provided with clutch detents 8 adapted to engage corresponding detents 9 secured to the wheels. In order to move the jacks to and from engagement with the wheels, I provide a rod 10, connected by means of links 11 to the sleeve 12 of each jack, such rod being movable by means of a hand lever 13, secured to the shaft 14, which shaft in turn is connected to the rod by means of an arm 15. As will readily be seen, each link 11 is connected to a sleeve 12 by means of a collar 16, within which such sleeve may rotate. In order to hold the jacks in upright or inoperative position, the frame 1 is provided with stops 17 adapted to engage pins 18 secured to the jacks.

In operation, when the vehicle is running normally, the jacks 7 are in the upright positions indicated in Figs. 1 and 2, the pins 18 being engaged by the stops 17. When it is desirable to raise the vehicle from its support through the wheels, the hand lever 13 is released and moved forwardly, thus causing the rod 10 to move in the opposite direction, the jacks 7 being thrust outwardly along the axles by means of the links 11. In their outward positions the detents 8 of the jacks engage the detents 9 of the wheels 3, 4, so that when the vehicle is driven a half revolution of the wheels it will be supported upon the jacks. In such position it will readily be seen that the vehicle is ready for machine or tire repairs. Also, by raising the machine each time a substantial stop is made and during such time as it stands in a garage the wear of the tires, due to the weight of the machine on them, will be eliminated.

I claim,—

1. In a motor vehicle, the combination of a frame normally supported by a plurality of wheels and having a propelling motor mounted thereon, driving connection between said motor and a pair of said wheels, a rotatable lifting jack mounted adjacent to one of said wheels and held normally in upward position, and means for bringing said jack in clutch with said wheel, thereby rendering the advance of the vehicle effective to cause said jack to raise its engaged wheel from the ground.

2. In a motor vehicle, the combination of a frame having as a part thereof a rotatable axle, wheels secured to said axle and provided with jack-engaging detents, a lifting jack rotatably mounted upon said axle and longitudinally slidable thereon, said jack having wheel-engaging detents, means for holding said jack in upward inoperative position, and means for sliding said jack longitudinally of said shaft and into engagement with said wheel.

In testimony whereof I have hereunto set my hand.

EDWARD W. McCARROLL.

Witnesses:
PAUL N. CRITCHLOW.
FRANCIS J. TOMASSON.